United States Patent
Mitsuda et al.

(10) Patent No.: US 11,036,935 B2
(45) Date of Patent: Jun. 15, 2021

(54) ARGUMENT STRUCTURE EXTENSION DEVICE, ARGUMENT STRUCTURE EXTENSION METHOD, PROGRAM, AND DATA STRUCTURE

(71) Applicant: NIPPON TELEGRAPH AND TELEPHONE CORPORATION, Tokyo (JP)

(72) Inventors: Ko Mitsuda, Tokyo (JP); Ryuichiro Higashinaka, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/970,334

(22) PCT Filed: Feb. 15, 2019

(86) PCT No.: PCT/JP2019/005622
§ 371 (c)(1),
(2) Date: Aug. 14, 2020

(87) PCT Pub. No.: WO2019/160098
PCT Pub. Date: Aug. 22, 2019

(65) Prior Publication Data
US 2021/0081607 A1 Mar. 18, 2021

(30) Foreign Application Priority Data
Feb. 16, 2018 (JP) .............................. JP2018-026313

(51) Int. Cl.
*G06F 17/00* (2019.01)
*G06F 40/186* (2020.01)
*G06F 16/903* (2019.01)

(52) U.S. Cl.
CPC ...... *G06F 40/186* (2020.01); *G06F 16/90335* (2019.01)

(58) Field of Classification Search
CPC ......................... G06F 40/186; G06F 16/90335
(Continued)

(56) References Cited

U.S. PATENT DOCUMENTS

| 6,199,034 B1 * | 3/2001 | Wical | G06F 40/30 704/9 |
| 6,785,651 B1 * | 8/2004 | Wang | G06F 40/154 704/246 |

(Continued)

OTHER PUBLICATIONS

Green, 'Annotating Evidence-Based Argumentation in Biomedical Text', 2015 IEEE International Conference on Bioinformatics and Biomedicine (BIBM) (Year: 2015).*

(Continued)

*Primary Examiner* — Stephen S Hong
*Assistant Examiner* — Matthew J Ludwig

(57) ABSTRACT

An argumentation structure can be automatically extended. A template creation unit 22 creates a template using a predetermined rewriting pattern by receiving, as an input, a proposition represented by each of nodes in an argumentation structure including the nodes respectively representing a main proposition of argumentation and a proposition that functions as an argument for another proposition. An additional proposition output unit 28 creates a proposition functioning as an argument for the input proposition using the created template and outputs the created proposition as a proposition represented by a node to be added to the argumentation structure.

20 Claims, 8 Drawing Sheets

(58) Field of Classification Search
USPC .............. 715/254, 256, 260; 704/4, 255, 266
See application file for complete search history.

(56) References Cited

U.S. PATENT DOCUMENTS

| | | | | |
|---|---|---|---|---|
| 7,912,702 B2* | 3/2011 | Bennett | ................. | G06F 40/216 |
| | | | | 704/9 |
| 8,032,375 B2* | 10/2011 | Chickering | ............ | G06Q 10/10 |
| | | | | 704/255 |
| 8,600,728 B2* | 12/2013 | Knight | .................. | G06F 40/154 |
| | | | | 704/2 |
| 8,671,341 B1* | 3/2014 | Hellwig | ................ | G06F 40/169 |
| | | | | 715/254 |
| 10,679,011 B2* | 6/2020 | Galitsky | ................ | G06N 3/006 |
| 10,796,102 B2* | 10/2020 | Galitsky | ................ | G06F 40/211 |
| 10,839,161 B2* | 11/2020 | Galitsky | ................ | G06F 40/216 |
| 2002/0178185 A1* | 11/2002 | Kuchinsky | ............ | G16B 50/00 |
| | | | | 715/201 |
| 2006/0271364 A1* | 11/2006 | Mirkovic | ................ | G06F 40/40 |
| | | | | 704/239 |
| 2013/0174026 A1* | 7/2013 | Locke | ................... | G06F 40/166 |
| | | | | 715/254 |
| 2018/0329879 A1* | 11/2018 | Galitsky | ................. | G06F 40/44 |
| 2019/0272323 A1* | 9/2019 | Galitsky | ............... | G06F 40/205 |
| 2020/0286463 A1* | 9/2020 | Galitsky | ................. | G10L 13/00 |
| 2021/0004541 A1* | 1/2021 | Saito | ....................... | G06F 40/20 |

OTHER PUBLICATIONS

Gabbay, 'Theory of Semi-Instantiation in Abstract Argumentation', Israel Science Foundation Project, 2015 (Year: 2015).*

Reed, The Argument Web: an Online Ecosystem of Tools, Systems and Services for Argumentation, Center for Argument Technology, University of Dundee DD1 4HN, UL (Year: 2017).*

Lawrence, Using Complex Argumentation Interaction to Reconstruct the Argumentative Structure of Large-Scale Debates, Proceedings of the 4th Workshop on Argument Minding, pp. 108-117 (Year: 2017).*

Lippi, Marco, et al., "Argumentation Mining: State of the Art and Emerging Trends" ACM Transactions on Internet Technology, vol. 16, No. 2, Article 10, Publication Date: Mar. 2016.

* cited by examiner

Fig. 3

| ID | ABBREVIATION | ENGLISH NAME | POLARITY | TEMPLATE (INPUT→OUTPUT) | EXAMPLE OF INPUT AND OUTPUT (INPUT→OUTPUT) |
|---|---|---|---|---|---|
| 1 | AA | Argument from Analogy | + | ... → (ONE CLAUSE IN ... IS REPLACED) | AUTOMATIC DRIVING IS GOOD → (AUTOMATIC DOOR) IS GOOD |
| 2 | EX | Argument from an Exceptional Case (Exception to a rule) | − | S... →(CLAUSE)+S...IS NOT REALLY... | BREAD IS SOFT→(OUTDATED) BREAD IS NOT REALLY SOFT |
| 3 | AC | Arguments from Consequences (Positive) | + | 1. S IS GOOD→S IS GOOD FOR (WORD)<br>2. ... → ...+"IS GOOD FOR (WORD)" | 1. AUTOMATIC DRIVING IS GOOD → AUTOMATIC DRIVING IS GOOD FOR (SAFETY)<br>2. IRRITATION DURING DRIVING IS REDUCED→REDUCTION OF IRRITATION DURING DRIVING IS GOOD FOR "HEALTH" |
| 4 | FD | Arguments from Consequences (Negative) / Fear & danger Appeal | − | 1. S IS BAD→S IS BAD FOR (WORD)<br>2. ... → ... +"IS BAD FOR (WORD)" | 1. AUTOMATIC DRIVING IS BAD→AUTOMATIC DRIVING IS BAD FOR (EMPLOYMENT)<br>2. DRIVERLESS TAXIS WILL APPEAR→APPEARANCE OF DRIVERLESS TAXIS ARE BAD FOR (TAXI DRIVERS) |
| 5 | AO | Arguments from Alternatives and Opposites | + | ... → (CLAUSE IS REPLACED WITH (NOUN IS MORE ... THAN NOUN) | BREAD IS HARD AND THUS FEELS HEAVY→(COOKED RICE IS HARDER THAN BREAD) AND THUS FEELS HEAVY |
| 6 | CO | Argument from Composition | + | 1. ... →"FOR EXAMPLE"+(CLAUSE)+...<br>2. ... →"FOR EXAMPLE"+(ONE CLAUSE IN ... IS REPLACED) | 1. OKINAWAN CUISINE IS UNIQUE→FOR EXAMPLE, OKINAWAN CUISINE (SUCH AS GOYA CHAMPURU) IS UNIQUE<br>2. IN COUNTRY LIFE, HUMAN RELATIONS ARE STRESSFUL→FOR EXAMPLE, IN COUNTRY LIFE, HUMAN RELATIONS ARE (TROUBLESOME) |
| 7 | AD | Argument from Division | + | ... →IN SHORT, (ONE CLAUSE IN ... IS REPLACED) | FOODS IN OKINAWA HAVE HIGH COST PERFORMANCE→IN SHORT, (GOODS) IN OKINAWA HAVE HIGH COST PERFORMANCE |
| 8 | CE | Argument from Cause to Effect | + | ... → (ONLY ONE CLAUSE IN ... IS REPLACED) | COUNTRY LIFE IS MORE LIVELY THAN CITY LIFE →COUNTRY LIFE IS MORE (SOCIABLE) THAN CITY LIFE |
| 9 | EC | Argument from Effect to Cause | + | ... → (ONLY ONE CLAUSE IN ... IS REPLACED) | EDUCATION OF CREW MEMBERS OF USJ IS PERFECT →(SERVICE) OF CREW MEMBERS OF USJ IS PERFECT |
| 10 | LK | Lack of Knowledge Argument | − | IT HAS BEEN LITTLE KNOWN | THE NUMBER OF SPECIAL A BRANDS OF COOKED RICE IS FORTY OR MORE→IT HAS BEEN LITTLE KNOWN |
| 11 | PO | Argument from Popular Opinion | + | EVERYONE THINKS SO | PRICES IN THE CITY ARE HIGH → EVERYONE THINKS SO |
| 12 | PK | Argument from position to know | + | (PERSON) WHO IS (WORD) SAID SO | YUI ARAGAKI IS FROM OKINAWA → (PERSON) WHO IS (FAN) SAID SO |
| 13 | EO | Argument from Expert Opinion | + | EXPERT ON (WORD) SAID SO | OKINAWA HAS MANY TYPHOONS → (WEATHER FORECASTER) SAID SO |
| 14 | WIT | Argument from witness testimony | + | (HE/SHE) SAW (WORD) | YUI ARAGAKI IS FROM OKINAWA → (HE/SHE) SAW (LIST OF ACTORS) |

Fig. 4

AA: (WORD) IS GOOD

EX: (WORD) AUTOMATIC DRIVING IS NOT REALLY GOOD

AC: AUTOMATIC DRIVING IS GOOD FOR (WORD)

FD: --

AO: MANUAL DRIVING IS BETTER THAN AUTOMATIC DRIVING

CO: FOR EXAMPLE, (CLAUSE) AUTOMATIC DRIVING IS GOOD

AD: IN SHORT, (WORD) IS GOOD
    IN SHORT, AUTOMATIC DRIVING IS (CLAUSE)

CE: (WORD) IS GOOD
    AUTOMATIC DRIVING IS (CLAUSE)

EC: (WORD) IS GOOD
    AUTOMATIC DRIVING IS (CLAUSE)

LK: IT HAS BEEN LITTLE KNOWN

PO: EVERYONE THINKS SO

PK: (WORD) SAID SO
    PERSON WHO IS (WORD) SAID SO

EO: (WORD) SAID SO
    EXPERT ON (WORD) SAID SO

WIT: (HE/SHE) SAW (WORD)

Fig. 5

WORD: ECONOMY, STOMACH, AUTOMATIC DOOR, HEALTH
CLAUSE: FOR ECONOMY, TO ECONOMY, ECONOMY IS, SUCH AS ECONOMY

Fig. 6

ECONOMY, STOMACH, AUTOMATIC DOOR, SAFETY

Fig. 7

AUTOMATIC DRIVING IS GOOD FOR (ECONOMY)

AUTOMATIC DRIVING IS GOOD FOR (STOMACH)

AUTOMATIC DRIVING IS GOOD FOR (AUTOMATIC DOOR)

AUTOMATIC DRIVING IS GOOD FOR (SAFETY)

| RANK | ADDITIONAL PROPOSITION CANDIDATE | Score | Word2vecScore | LangModelScore |
|---|---|---|---|---|
| 1 | AUTOMATIC DRIVING IS GOOD FOR (ECONOMY) | -0.28 | 0.54 | -1.6 |
| 2 | AUTOMATIC DRIVING IS GOOD FOR (SAFETY) | -0.42 | 0.48 | -1.8 |
| 3 | AUTOMATIC DRIVING IS GOOD FOR (AUTOMATIC DOOR) | -1.48 | 0.22 | -3.4 |
| 4 | AUTOMATIC DRIVING IS GOOD FOR (STOMACH) | -2.65 | 0.15 | -5.6 |
| ... | | | | |

Fig. 9

AUTOMATIC DRIVING IS GOOD FOR ECONOMY (SCHEME: AC, SUPPORT)
AUTOMATIC DRIVING IS GOOD FOR SAFETY (SCHEME: AC, SUPPORT)

ARGUMENT STRUCTURE EXTENSION DEVICE, ARGUMENT STRUCTURE EXTENSION METHOD, PROGRAM, AND DATA STRUCTURE

CROSS-REFERENCE TO RELATED APPLICATIONS

This application is a U.S. 371 Application of International Patent Application No. PCT/JP2019/005622, filed on 15 Feb. 2019, which application claims priority to and the benefit of JP Application No. 2018-026313, filed on 16 Feb. 2018, the disclosures of which are hereby incorporated herein by reference in their entireties.

TECHNICAL FIELD

The present invention relates to an argumentation structure extension device, an argumentation structure extension method, a program, and a data structure.

BACKGROUND ART

In a dialogue system, a human interacts with a computer to acquire various information or to satisfy a request. In addition, a dialogue system that achieves a predetermined task and conducts daily conversations is also present. With this dialogue system, a human achieves metal stability, satisfies self-esteem needs, and builds a relationship of trust. The details of the type of the dialogue system are disclosed in Reference Literature 1 or Reference Literature 2.

Reference Literature 1: Voice Dialogue System, Tatsuya KAWAHARA and Masahiro ARAKI, Ohmshya Ltd., 2006

Reference Literature 2: Dialogue System, Mikio NAKANO, Kazunori KOMATANI, Kotaro FUNAKOSHI, Yukiko NAKANO, Manabu OKUMURA (Editor), Corona Publishing Co., Ltd. 2016

On the other hand, in addition to task achievement or daily conversation, research for implementing deeper argumentation with a computer has also progressed. Argumentation acts to change a value determination of a human or to organize thoughts and plays an important role for a human. For example, research discloses a model of argumentation.

In a model (Reference Literature 3) of argumentation disclosed by Walton, propositions are tied with arrows representing support (plus), non-support (minus), or an argumentation scheme (a pattern of support/non-support). An argumentation structure in the model disclosed by Walton is shown in FIG. 11. An ellipse is a node representing a proposition. A character string representing a proposition is given to a node. "flowers are beautiful" is connected to "Going to the mountains is good" through plus, which shows support. "Climbing is tiring" is connected to "Going to the mountains is good" through minus, which shows a counterargument. In addition, "climbing is tiring" is connected to "body can be strengthened" through minus, which shows a counterargument. In the drawing, an argumentation scheme called "Practical Reasoning (PR)" is used. Plus before PR shows support. PR refers to a an argumentation pattern in which "a good reason that can be generally accepted is used for support or non-support". In Reference Literature 3, 29 argumentation schemes are listed. In addition to PR, for example, Expert Opinion (a reason that is presented by an expert is used for support or non-support) is listed.

Reference Literature 3: Methods of Argumentation, Douglas Walton, Cambridge University Press, 2013

There are many attempts to automatically extract an argumentation structure from text data. This study is summarized in Non-Patent Literature 1 below.

In addition, as an application of the argumentation structure, a study (Reference Literature 4) relating to a Dialogue system that conducts argumentation based on a manually created argumentation structure is present. In Reference Literature 4, argumentation is conducted by mapping a user utterance in a node in an argumentation structure and returning a node having a relation of connection to the node to the user as a system utterance.

Reference Literature 4: Ryuichiro Higashinaka et al, Argumentative dialogue system based on argumentation structures, Proceedings of The 21st Workshop on the Semantics and Pragmatics of Dialogue, p. 154-155, 2017

CITATION LIST

Patent Literature

Non-Patent Literature

Non-Patent Literature 1: Lippi, M., Torroni, P., Argumentation Mining: State of the Art and Emerging Trends, ACM Transactions on Internet Technology, 16(2): 10, 2016.

SUMMARY OF THE INVENTION

Technical Problem

As summarized in Non-Patent Literature 1, there are attempts to extract an argumentation structure from a text. However, there is no technique of extending an argumentation structure by automatically adding an argument when the argumentation structure is provided.

An object of the present invention is to provide an argumentation structure extension device that automatically extends an argumentation structure, an argumentation structure extension method, a program, and a data structure.

Means for Solving the Problem

In order to achieve the object, an argumentation structure extension device of the present invention includes: a template creation unit that creates a template using a predetermined rewriting pattern by receiving, as an input, a proposition represented by each of nodes in an argumentation structure including the nodes respectively representing a main proposition of argumentation and a proposition that functions as an argument for another proposition; and an additional proposition output unit that creates a proposition functioning as an argument for the input proposition using the created template and outputs the created proposition as a proposition represented by a node to be added to the argumentation structure.

An argumentation structure extension method of the present invention includes: a template creation unit creating a template using a predetermined rewriting pattern by receiving, as an input, a proposition represented by each of nodes in an argumentation structure including the nodes respectively representing a main proposition of argumentation and a proposition that functions as an argument for another proposition; and an additional proposition output unit creating a proposition functioning as an argument for the input proposition using the created template and outputting the created proposition as a proposition represented by a node to be added to the argumentation structure.

A program of the present invention allows a computer to function as each of the units of the above-described argumentation structure extension device.

A data structure of the present invention outputs a proposition represented by a node to be added to an argumentation structure including nodes respectively representing a main proposition of argumentation and a proposition that functions as an argument for another proposition, the data structure including items of: an argumentation scheme for the proposition represented by the node to be added; a polarity that represents whether or not the proposition represented by the node to be added supports a proposition represented by a node to be extended; and a rewriting pattern that rewrites the proposition represented by the node to be extended by replacing a word or a clause or adding a word or a clause.

Effects of the Invention

In the argumentation structure extension device, the method, and the program according to the present invention, an argumentation structure can be automatically extended by inputting a proposition represented by the node in the argumentation structure, creating a template using a predetermined rewriting pattern, creating a proposition functioning as an argument for the input proposition using the created template, and outputting the created proposition as a proposition represented by a node to be added to the argumentation structure.

The data structure according to the present invention includes the following items of: an argumentation scheme for the proposition represented by the node to be added; a polarity that represents whether or not the proposition represented by the node to be added supports a proposition represented by a node to be extended; and a rewriting pattern that rewrites the proposition represented by the node to be extended by replacing a word or a clause or adding a word or a clause. As a result, the argumentation structure can be automatically extended.

BRIEF DESCRIPTION OF DRAWINGS

FIG. 3 is a diagram showing an example of a template list.

FIG. 4 is a diagram showing an example of an output of a template creation unit.

FIG. 5 is a diagram showing an example of an element list.

FIG. 6 is diagram showing an example of a word list that is output by a filling element list unit.

FIG. 7 is a diagram showing an example of additional proposition candidates.

FIG. 8 is a diagram showing an example of ranks and scores of the additional proposition candidates.

FIG. 9 is a diagram showing an output example of an additional proposition.

DESCRIPTION OF EMBODIMENTS

Hereinafter, an embodiment of the present invention will be described using the drawings.

<Summary of Embodiment>

When a predetermined argumentation structure is present in one domain, an argumentation structure extension device according to the embodiment automatically adds a node functioning as an argument to nodes in the argumentation structure. Specifically, a proposition (a proposition representing support or a proposition representing non-support) functioning as an argument for a proposition (the proposition is expressed in text) represented by each of the nodes in the argumentation structure is created and connected to the original node as an additional node. The proposition of the node to be added is created using a template for creating a node that is prepared per argumentation scheme. The argumentation scheme represents a typical pattern of argumentation. Therefore, by using the argumentation scheme, a robust proposition can be added to various nodes.

Figure 1:
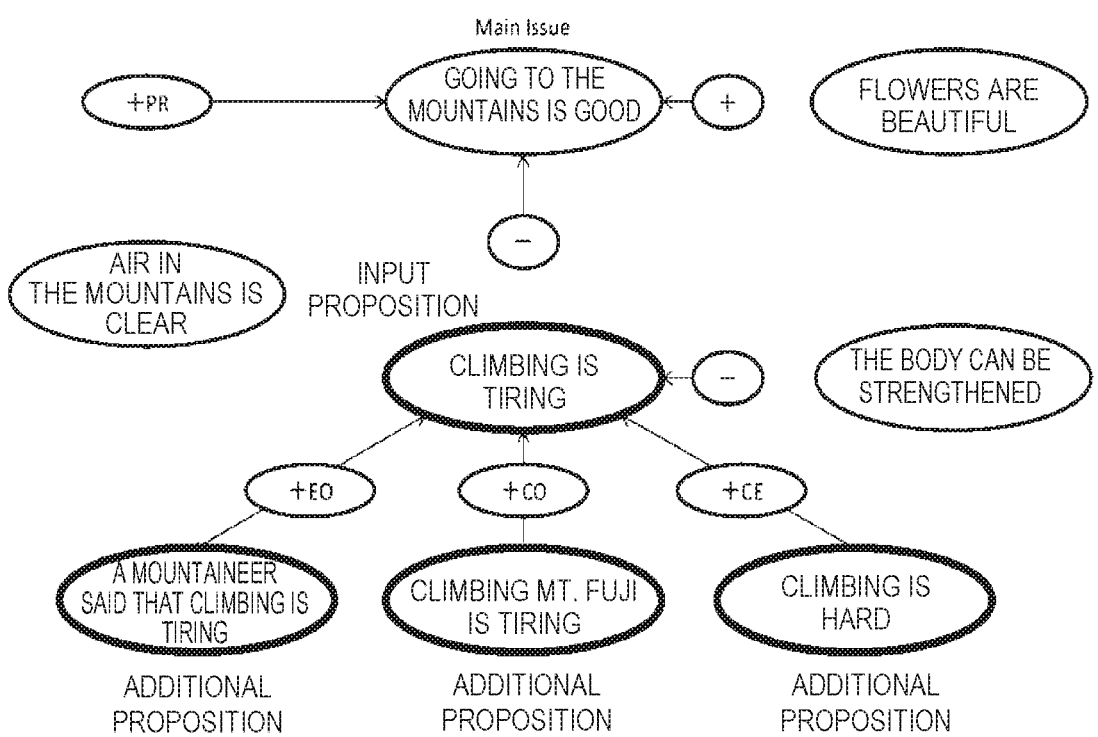
FIG. 1 is a schematic diagram showing an extended argumentation structure.

FIG. 1 shows a part of propositions of nodes to be added. The drawing shows nodes added to a proposition "climbing is tiring" using argumentation schemes such as EO (Expert Opinion), CO (Composition), and CE (from Cause to Effect). The details of each of the argumentation schemes will be described below in Examples.

<Configuration of Argumentation Structure Extension Device According to Embodiment>

Figure 2:
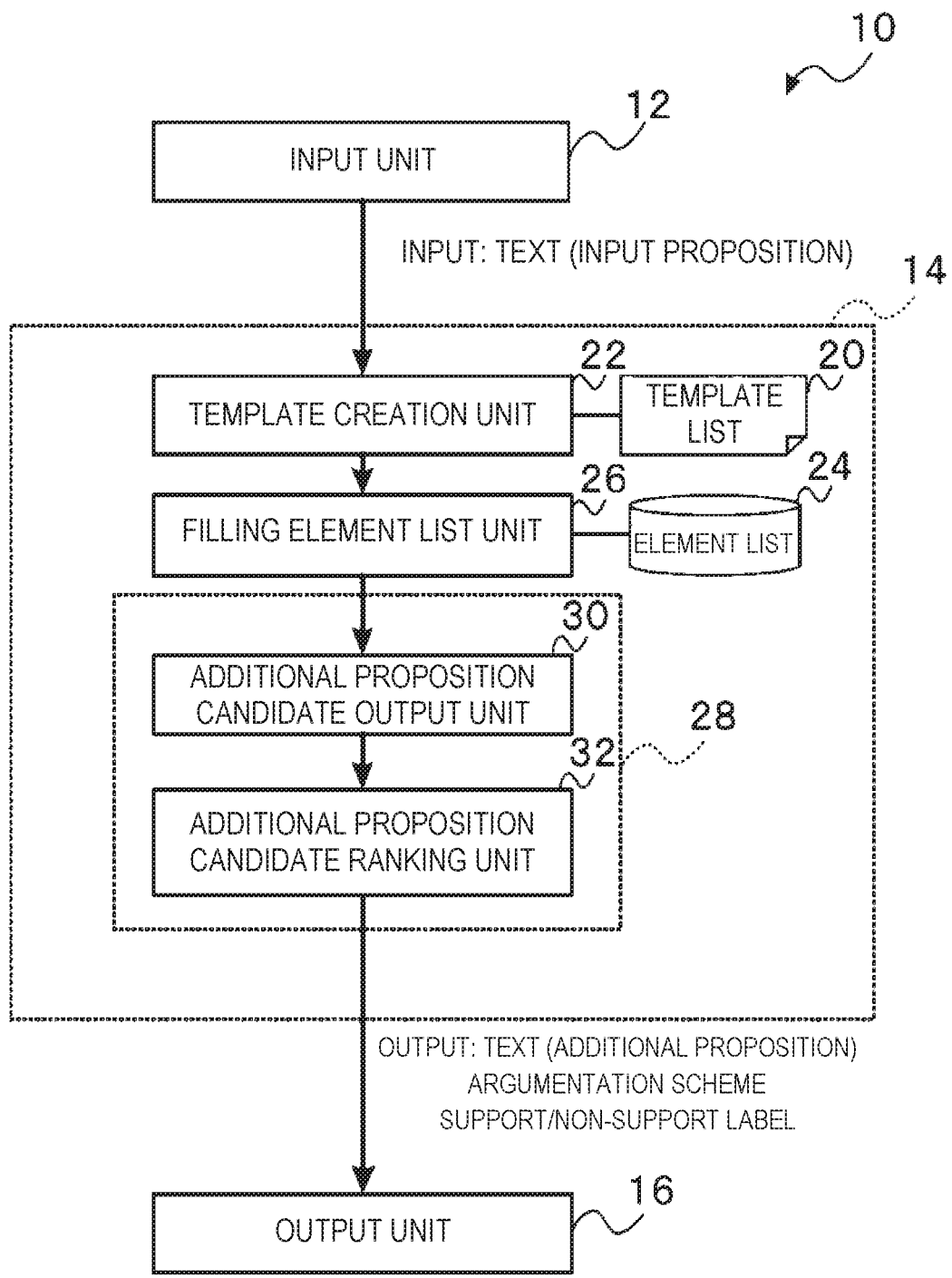
FIG. 2 is a block diagram showing a functional configuration of an argumentation structure extension device according to an embodiment of the present invention.

FIG. 2 is a block diagram showing a functional configuration of an argumentation structure extension device 10 according to the embodiment. As shown in FIG. 2, the argumentation structure extension device 10 according to the embodiment includes an input unit 12, an arithmetic unit 14, and an output unit 16.

The input unit 12 receives, as an input, a text (proposition) described in any node in a predetermined argumentation structure. When a node in the argumentation structure is used as an input, a text described in the node is used as an input.

The argumentation structure includes nodes respectively representing a main proposition of argumentation and a proposition that functions as an argument for another proposition.

When the arithmetic unit 14 can create a proposition (additional proposition) functioning as an argument for the input proposition, the arithmetic unit 14 causes the output unit 16 to output the created proposition.

The arithmetic unit 14 includes a template list 20, a template creation unit 22, an element list 24, a filling element list unit 26, and an additional proposition output unit 28.

The template list 20 is a list of templates representing predetermined rewriting patterns for a proposition and is a data structure for outputting a proposition represented by a node to be added to the argumentation structure. The template list 20 is a data structure including the following items of: an argumentation scheme for the proposition represented by the node to be added; a polarity that represents whether or not the proposition represented by the node to be added supports a proposition represented by a node to be extended; and a rewriting pattern that rewrites the proposition represented by the node to be extended by replacing a word or a clause or adding a word or a clause.

FIG. 3 is a template list used in the embodiment. This template list collectively shows rewriting patterns when a proposition functioning as an argument for a proposition to be extended is created from the proposition to be extended using an argumentation scheme defined in Reference Literature 3. In order from the left, the respective columns of FIG. 3 show a serial number of a scheme of a proposition to be added, an abbreviation, an English name, support/non-support (support is represented by "+", and non-support is represented by "−") of a proposition to be extended for a proposition to be added, a rewriting method, and a rewriting example. Parentheses included in an output after rewriting represent a blank, and a final template is created by filling an appropriate filling element (a word or a clause) in the blank.

Basically, the rewriting of the input is restricted such that a template is created by replacing one clause or adding one clause. The reason for this is that, when the number of blanks after rewriting is large, it is difficult to automatically estimate appropriate elements such that the accuracy rate of an additional proposition that is finally output decreases. Among the argumentation schemes defined in Reference Literature 3, a scheme that cannot be expressed by replacement or addition of one clause is excluded from the template list.

The template creation unit 22 receives, as an input, a text representing a proposition of a node to be extended and creates templates for creating additional proposition candidates using the templates stored in the template list 20.

For example, as shown in FIG. 4, templates that are created by rewriting the input "automatic driving is good" and templates that are created irrespective of the input are output. "−" corresponds to no output and represents that a template cannot be created with the corresponding scheme.

The element list 24 stores a word list in which words that are likely to be filled in the template are listed and a clause list in which clauses that are likely to be filled in the template are listed.

FIG. 5 shows an example of the word list and the clause list including the element list. A row starting with "Word" represents the word list, and a row starting with "Clause" represents the clause list.

The filling element list unit 26 outputs all the words in the word list or all the clauses in the clause list according to the blank in the template using the element list 24.

FIG. 6 shows an example of elements that are output to the template of the AC scheme in FIG. 4. This way, in the template of the AC scheme in FIG. 4, a word as an element of the blank is filled. Therefore, all the words in the word list are output.

The additional proposition output unit 28 creates a proposition functioning as an argument for the input proposition using the created template and outputs the created proposition as a proposition represented by a node to be added to the argumentation structure.

Specifically, the additional proposition output unit 28 includes an additional proposition candidate output unit 30 and an additional proposition candidate ranking unit 32.

The additional proposition candidate output unit 30 fills each of the words in the word list included in the element list 24 or each of the clauses in the clause list included in the element list 24 in the blank included in the created template to create additional proposition candidates.

Specifically, a number of additional proposition candidates of elements output from the filling element list unit 26 are output per template. At this time, one element is filled in one blank of the template.

FIG. 7 shows an example of additional proposition candidates that are created using the template (FIG. 4) of the AC scheme output from the template creation unit 22 and the element list (FIG. 6) output from the filling element list unit 26 for the AC scheme.

The additional proposition candidate ranking unit 32 ranks the additional proposition candidates to output a high-ranking additional proposition candidate as the proposition represented by the node to be added to the argumentation structure.

Specifically, the additional proposition candidate ranking unit 32 outputs the proposition functioning as the argument for the input proposition by ranking the additional proposition candidates output from the additional proposition candidate output unit 30. When a node of the argumentation structure is used as an input, the output of the additional proposition candidate ranking unit 32 is a proposition of a node representing support or non-support. When the additional proposition candidates are ranked, a method (for example, a language model described below) of calculating the probability of a sentence and a method of calculating the similarity between sentences (for example, word2vec described below) are used.

The language model refers to a model for calculating the probability of any character string. By using the language model, an inappropriate character string having a low probability can be determined. The language model can be created using a language model creation tool after preparing large-scale text sets and inputting the text sets into a morphological analysis tool to separate words with spaces. For example, dump data of Wikipeda (R) (http://dumps.wikimedia.org/) is used as the large-scale text sets, MeCab (http://taku910.github.io/mecab/) is used as the morphological analysis tool, and kenlm (https://kheafield.com/code/kenlm/) is used as the language model creation tool. In the additional proposition candidate ranking unit 32, the probability of each of the additional proposition candidates as a sentence is calculated using the language model created in advance. Word2vec is a method of expressing a word as a vector. Any words can be expressed as vectors using a model that is created using word2vec, and the similarity between the contents of the words can be estimated by calculating the distance between vectors thereof. In addition, when there are two sentences, average vectors of words included in the respective sentences are calculated, and the similarity between the contents of the sentences can be estimated by calculating the distance between the average vectors. By using word2vec, an inappropriate additional proposition candidate whose content is significantly different from that of the input proposition can be determined. In order to create the model of word2vec, as in the language model, large-scale text sets in which words are separated with spaces are prepared and applied to a tool of word2vc. As the word2vec creation tool, for example, gensim (https://radimrehurek.com/gensim/) is used. In the additional proposition candidate ranking unit 32, the similarity between the contents of the input proposition and each of the additional proposition candidates is estimated using word2vec created in advance.

Using the language model and word2vec, the probability of each of the additional proposition candidate as a sentence and the degree of association between each of the additional proposition candidates and the input proposition are calculated, and weighted values thereof are added up. As a result, a final score of each of the additional proposition candidates is determined. This calculation formula is as follows.

$$\text{Score} = (\text{Word2vecScore} + w \times \text{LangModelScore} \qquad \text{[Formula 1]}$$

LangModelScore represents a score of the language model for the additional proposition candidate, and Word2vecScore represents a score of word2vec for the additional proposition candidate. $w$ represents a weighting factor of LangModelScore. By calculating the score for each of the additional proposition candidates based on this formula, the additional proposition candidate is ranked. For example, the score is calculated by setting w to 0.5.

FIG. 8 shows an example of the score and the ranking calculated for each of the additional proposition candidates shown FIG. 7.

FIG. 9 shows an actual output in the case of FIG. 8. For example, "automatic driving is good for economy" and "automatic driving is good for safety" that are rank 1 and rank 2 are output such that candidates having a score that is higher than or equal to −1.0 as a threshold are output. At this time, the type of the argumentation scheme of the additional proposition candidate and the support/non-support of the scheme are collectively output. With this output, for example, the utterance "automatic driving is good for economy" can be created as a reason for the utterance "automatic driving is good".

<Operation of Argumentation Structure Extension Device 10 According to Embodiment>

Figure 10:
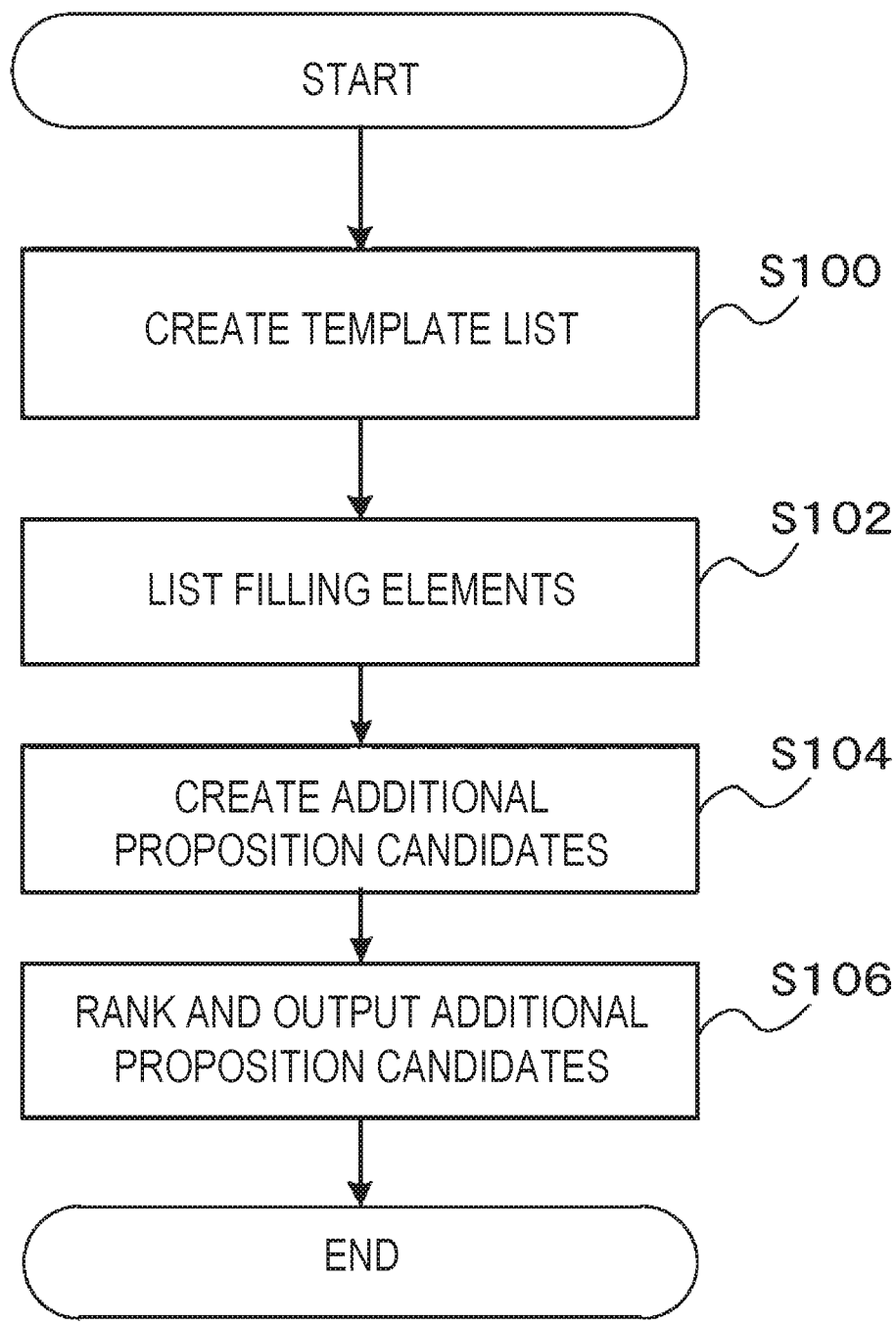
FIG. 10 is a flowchart showing a flow of an argumentation structure extension process according to the embodiment.
Figure 11:
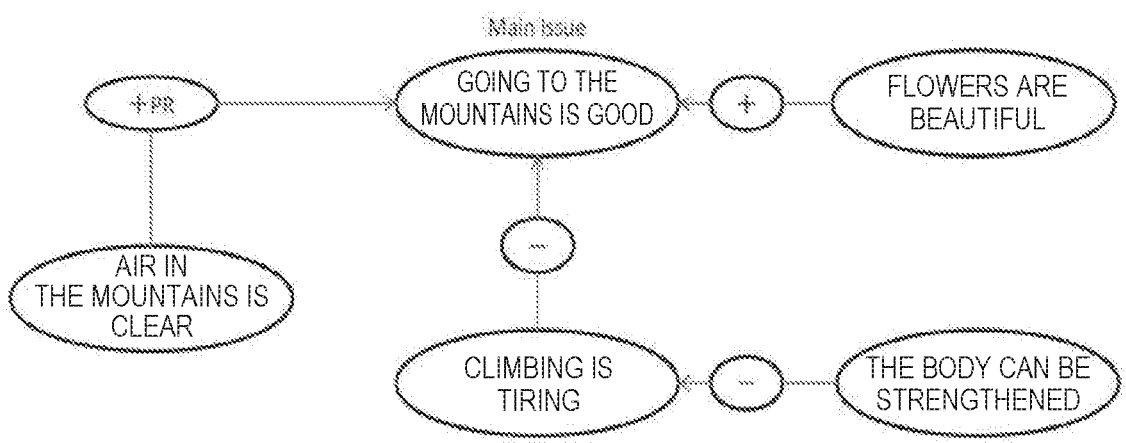
FIG. 11 is a schematic diagram showing an argumentation structure in a theory of Walton.

The flow of an argumentation structure extension process by the argumentation structure extension device 10 according to the embodiment will be described using a flowchart shown in FIG. 10. In the embodiment, when a text representing a proposition of a node to be extended in a predetermined argumentation structure is input to the argumentation structure extension device 10, the argumentation structure extension process starts.

In Step S100, an input text representing a proposition of a node to be extended is received, and templates for creating additional proposition candidates are created using the templates stored in the template list 20.

In Step 3102, the filling element list unit 26 outputs all the words in the word list or all the clauses in the clause list according to the blank in the template using the element list 24.

In Step S104, each of the words in the word list included in the element list 24 or each of the clauses in the clause list included in the element list 24 is filled in the blank included in the created template to create additional proposition candidates.

In Step S106, the additional proposition candidates are ranked to output a high-ranking additional proposition candidate as the proposition represented by the node to be added to the argumentation structure from the output unit 16.

As described above, in the argumentation structure extension device according to the embodiment, an argumentation structure can be automatically extended by inputting a proposition represented by the node in the argumentation structure, creating a template using a predetermined rewriting pattern, creating a proposition functioning as an argument for the input proposition using the created template, and outputting the created proposition as a proposition represented by a node to be added to the argumentation structure.

In addition, by extending the argumentation structure, the performance of a system that executes a process based on the argumentation structure is improved. For example, in the dialogue system disclosed in Reference Literature 4 in which argumentation is conducted using an argumentation structure prepared in advance, by extending the argumentation structure, various user utterances can be mapped in nodes in the argumentation structure. Therefore, the system can return appropriate responses to more various user utterances.

In the embodiment, the above-described argumentation structure extension device includes a computer system.

However, "computer system" also includes a homepage providing environment (or displaying environment) as long as it uses a WWW system.

In addition, the constructed program may be stored in a portable medium such as a hard disk or CD-ROM to be installed on or distributed to a computer.

REFERENCE SIGNS LIST

10 Argumentation structure extension device
12 Input unit
14 Arithmetic unit
16 Output unit
20 Template list
22 Template creation unit
24 Element list
26 Element list unit
28 Additional proposition output unit
30 Additional proposition candidate output unit
32 Additional proposition candidate ranking unit

The invention claimed is:

1. A computer-implemented method for automatically extending aspects of argumentation, the method comprising:
receiving a first input, the first input indicating a first proposition as a main proposition of argumentation;
receiving a second input, the second input indicating a second proposition as an additional proposition of argumentation relating to the first proposition;
generating an argumentation structure, wherein the argumentation structure includes:
a first node representing the main proposition,
a second node representing the second proposition,
a link connecting from the second node to the first node, and
the link referring to an argumentation scheme, wherein the argumentation scheme represents a pattern of argumentation for the second proposition in relation to the main proposition;
generating, based on the generated argumentation structure, a template including a blank placeholder and one or more predetermined rewritable patterns for extending the argumentation structure based on the second proposition using the one or more predetermined rewritable patterns based on words used in the second proposition;
automatically generating, based on the generated template, a third proposition, the third proposition represented by a third node added to the argumentation structure and extending the argumentation structure by rewriting the second proposition using one or more words for filling the blank placeholder according to the one or more predetermined rewritable patterns; and
providing the third proposition.

2. The computer-implemented method of claim 1, the method further comprising
generating the template, wherein the template includes at least a blank placeholder for inserting a word or a clause, the clause including one or more words;
populating the blank placeholder with at least one of:
a word from a predetermined word list, or
a clause from a predetermined clause list;
generating a plurality of proposition candidates based on the generated template with content of the populated blank placeholder; and
selecting one of the plurality of proposition candidates as the third proposition based at least on a predetermined selection criteria.

3. The computer-implemented method of claim 2, the method further comprising:
   determining a degree of support relating to argumentation of at least one of the plurality of proposition candidates to the second proposition based at least on:
     a probability of the at least one of the plurality of proposition candidates appearing in a predetermined test strings in sentences, or
     a degree of similarity between the at least one of the plurality of proposition candidates and the second proposition based on vector forms of words;
   ranking each of the at least one of the plurality of proposition candidates based on the determined degree of support of the at least one of the plurality of proposition candidates; and
   selecting the highest ranked one of the plurality of proposition candidates as the third proposition.

4. The computer-implemented method of claim 1, wherein the argumentation scheme corresponds to one or more of argument types, the argument types include one or more of:
   argument from analogy,
   argument from an exceptional case,
   argument from consequences (positive),
   argument from consequences (negative) based on fear and danger appeal,
   argument from alternatives and opposites,
   argument from composition (example),
   argument from division,
   argument from cause to effect,
   argument from effect to cause,
   a lack of knowledge argument,
   argument from popular opinion,
   argument from position to know,
   argument from expert opinion, and
   argument from witness testimony, and wherein the argumentation scheme includes an indication of a proposition being one of supportive or non-supportive of another proposition.

5. The computer-implemented method of claim 1, the method further comprising:
   receiving a query input;
   selecting the second node in the argumentation structure based on the query input based on similarity of proposition between the query input and the second proposition;
   automatically generating the third proposition as a response proposition based on the generated template for extending argumentation based on the second proposition;
   providing the third proposition as a response to the query input.

6. The computer-implemented method of claim 5, the method further comprising:
   inserting a third node and an additional link to the argumentation structure, the third node representing the third proposition as the response proposition and the new link representing an argumentation scheme of the response proposition to the second proposition.

7. The computer-implemented method of claim 5, the method further comprising:
   generating a set of templates based on the argumentation scheme of the link connecting the second node to the first node;
   identifying one of an argument type of the query input;
   selecting one of the set of templates based on the identified one of the argument types;
   generating proposition candidates using the selected one of the set of templates; and
   automatically generating the third proposition as a response proposition based on the selected template.

8. A system including a computer for machine learning, the system comprises:
   a non-transitory memory storing computer-executable instructions that when executed by the computer cause the computer to:
   receiving a first input, the first input indicating a first proposition as a main proposition of argumentation;
   receiving a second input, the second input indicating a second proposition as an additional proposition of argumentation relating to the first proposition;
   generating an argumentation structure, wherein the argumentation structure includes:
     a first node representing the main proposition,
     a second node representing the second proposition,
     a link connecting from the second node to the first node, and
     the link referring to an argumentation scheme, wherein the argumentation scheme represents a pattern of argumentation for the second proposition in relation to the main proposition;
   generating, based on the generated argumentation structure, a template including a blank placeholder and one or more predetermined rewritable patterns for extending the argumentation structure based on the second proposition using the one or more predetermined rewritable patterns based on words used in the second proposition;
   automatically generating, based on the generated template, a third proposition, the third proposition represented by a third node added to the argumentation structure and extending the argumentation structure by rewriting the second proposition using one or more words for filling the blank placeholder according to the one or more predetermined rewritable patterns; and
   providing the third proposition.

9. The system of claim 8, the computer-executable instructions when executed further causing the system to:
   generate the template, wherein the template includes at least a blank placeholder for inserting a word or a clause, the clause including one or more words;
   populate the blank placeholder with at least one of:
     a word from a predetermined word list, or
     a clause from a predetermined clause list;
   generate a plurality of proposition candidates based on the generated template with content of the populated blank placeholder; and
   select one of the plurality of proposition candidates as the third proposition based at least on a predetermined selection criteria.

10. The system of claim 8, the computer-executable instructions when executed further causing the system to:
   determine a degree of support relating to argumentation of at least one of the plurality of proposition candidates to the second proposition based at least on:
     a probability of the at least one of the plurality of proposition candidates appearing in a predetermined test strings in sentences, or
     a degree of similarity between the at least one of the plurality of proposition candidates and the second proposition based on vector forms of words;

rank each of the at least one of the plurality of proposition candidates based on the determined degree of support of the at least one of the plurality of proposition candidates; and
select the highest ranked one of the plurality of proposition candidates as the third proposition.

11. The system of claim 8, wherein the argumentation scheme corresponds to one or more of argument types, the argument types include one or more of:
argument from analogy,
argument from an exceptional case,
argument from consequences (positive),
argument from consequences (negative) based on fear and danger appeal,
argument from alternatives and opposites,
argument from composition (example),
argument from division,
argument from cause to effect,
argument from effect to cause,
a lack of knowledge argument,
argument from popular opinion,
argument from position to know,
argument from expert opinion, and
argument from witness testimony, and wherein the argumentation scheme includes an indication of a proposition being one of supportive or non-supportive of another proposition.

12. The system of claim 8, the computer-executable instructions when executed further causing the system to:
receive a query input;
select the second node in the argumentation structure based on the query input based on similarity of proposition between the query input and the second proposition;
automatically generate the third proposition as a response proposition based on the generated template for extending argumentation based on the second proposition; and
provide the third proposition as a response to the query input.

13. The system of claim 12, the computer-executable instructions when executed further causing the system to:
insert a third node and an additional link to the argumentation structure, the third node representing the third proposition as the response proposition and the new link representing an argumentation scheme of the response proposition to the second proposition.

14. The system of claim 12, the computer-executable instructions when executed further causing the system to:
generate a set of templates based on the argumentation scheme of the link connecting the second node to the first node;
identify one of an argument type of the query input;
select one of the set of templates based on the identified one of the argument types;
generate proposition candidates using the selected one of the set of templates; and
automatically generate the third proposition as a response proposition based on the selected template.

15. A non-transitory computer-readable recording medium storing computer-executable instructions that when executed by a computer causes the computer to:
receiving a first input, the first input indicating a first proposition as a main proposition of argumentation;
receiving a second input, the second input indicating a second proposition as an additional proposition of argumentation relating to the first proposition;
generating an argumentation structure, wherein the argumentation structure includes:
a first node representing the main proposition,
a second node representing the second proposition,
a link connecting from the second node to the first node, and
the link referring to an argumentation scheme, wherein the argumentation scheme represents a pattern of argumentation for the second proposition in relation to the main proposition;
generating, based on the generated argumentation structure, a template including a blank placeholder and one or more predetermined rewritable patterns for extending the argumentation structure based on the second proposition using the one or more predetermined rewritable patterns based on words used in the second proposition;
automatically generating, based on the generated template, a third proposition, the third proposition represented by a third node added to the argumentation structure and extending the argumentation structure by rewriting the second proposition using one or more words for filling the blank placeholder according to the one or more predetermined rewritable patterns; and
providing the third proposition.

16. The computer-readable non-transitory recording medium of claim 15, the computer-executable instructions when executed further causing the system to:
generate the template, wherein the template includes at least a blank placeholder for inserting a word or a clause, the clause including one or more words;
populate the blank placeholder with at least one of:
a word from a predetermined word list, or
a clause from a predetermined clause list;
generate a plurality of proposition candidates based on the generated template with content of the populated blank placeholder; and
select one of the plurality of proposition candidates as the third proposition based at least on a predetermined selection criteria.

17. The computer-readable non-transitory recording medium of claim 15, the computer-executable instructions when executed further causing the system to:
determine a degree of support relating to argumentation of at least one of the plurality of proposition candidates to the second proposition based at least on:
a probability of the at least one of the plurality of proposition candidates appearing in a predetermined test strings in sentences, or
a degree of similarity between the at least one of the plurality of proposition candidates and the second proposition based on vector forms of words;
rank each of the at least one of the plurality of proposition candidates based on the determined degree of support of the at least one of the plurality of proposition candidates; and
select the highest ranked one of the plurality of proposition candidates as the third proposition.

18. The computer-readable non-transitory recording medium of claim 15, the computer-executable instructions when executed further causing the system to:
receive a query input;
select the second node in the argumentation structure based on the query input based on similarity of proposition between the query input and the second proposition;

automatically generate the third proposition as a response proposition based on the generated template for extending argumentation based on the second proposition; and provide the third proposition as a response to the query input.

19. The computer-readable non-transitory recording medium of claim 18, the computer-executable instructions when executed further causing the system to:

insert a third node and an additional link to the argumentation structure, the third node representing the third proposition as the response proposition and the new link representing an argumentation scheme of the response proposition to the second proposition.

20. The computer-readable non-transitory recording medium of claim 18, the computer-executable instructions when executed further causing the system to:

generate a set of templates based on the argumentation scheme of the link connecting the second node to the first node;

identify one of an argument type of the query input;

select one of the set of templates based on the identified one of the argument types;

generate proposition candidates using the selected one of the set of templates; and automatically generate the third proposition as a response proposition based on the selected template.

* * * * *